INVENTORS
Robert H. Clark
Philip E. Myers
by Wolfe, Hubbard, Voit & Osann
ATTORNEYS

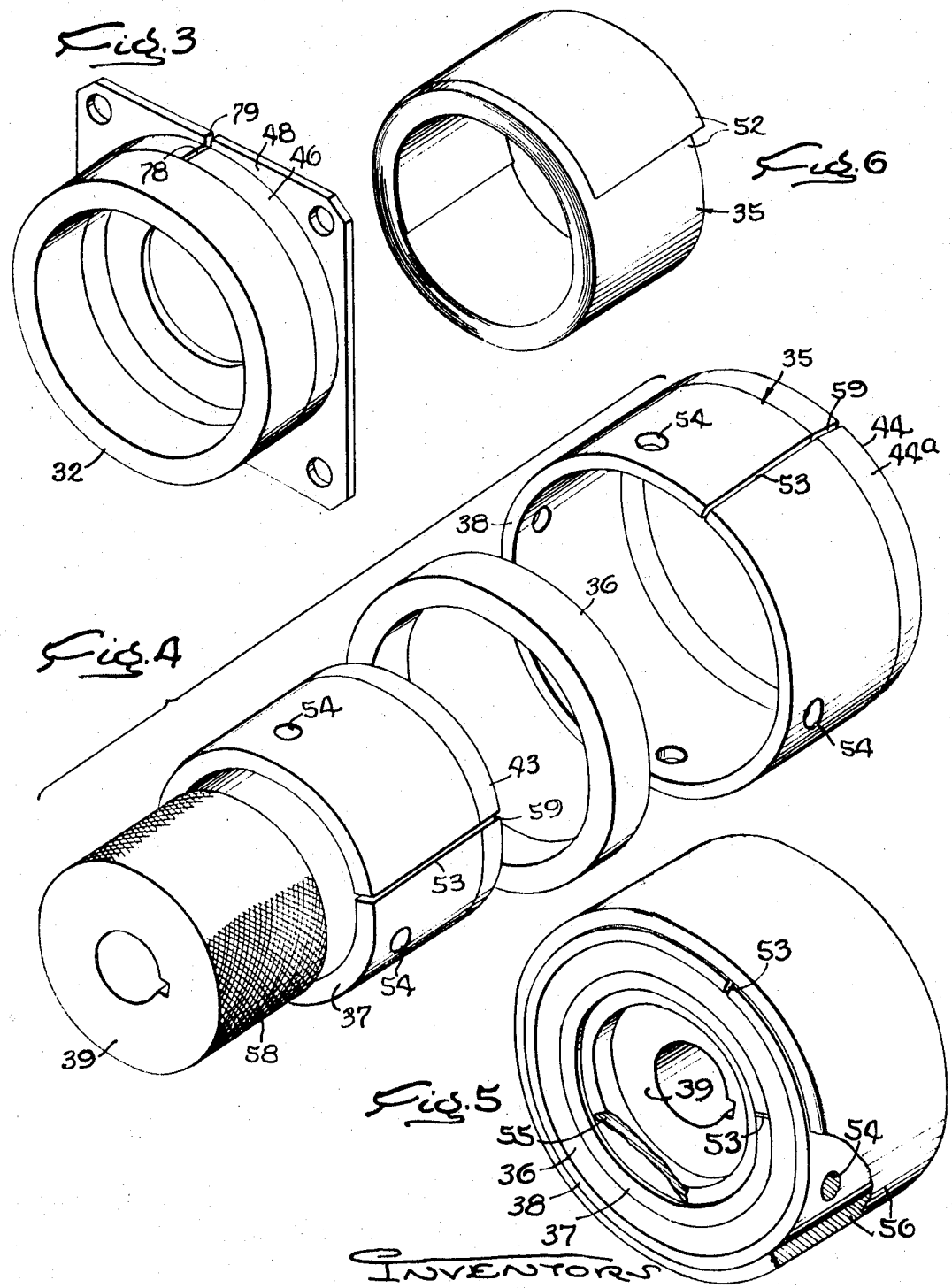

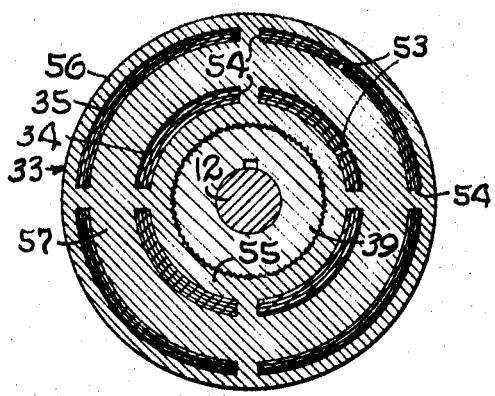
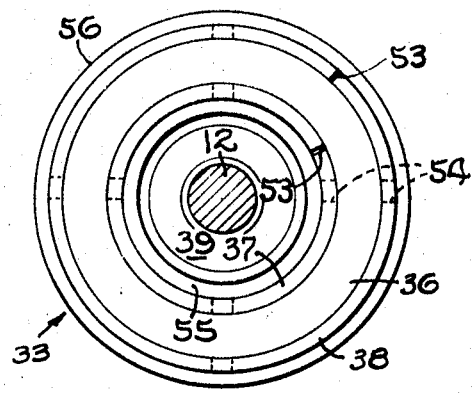
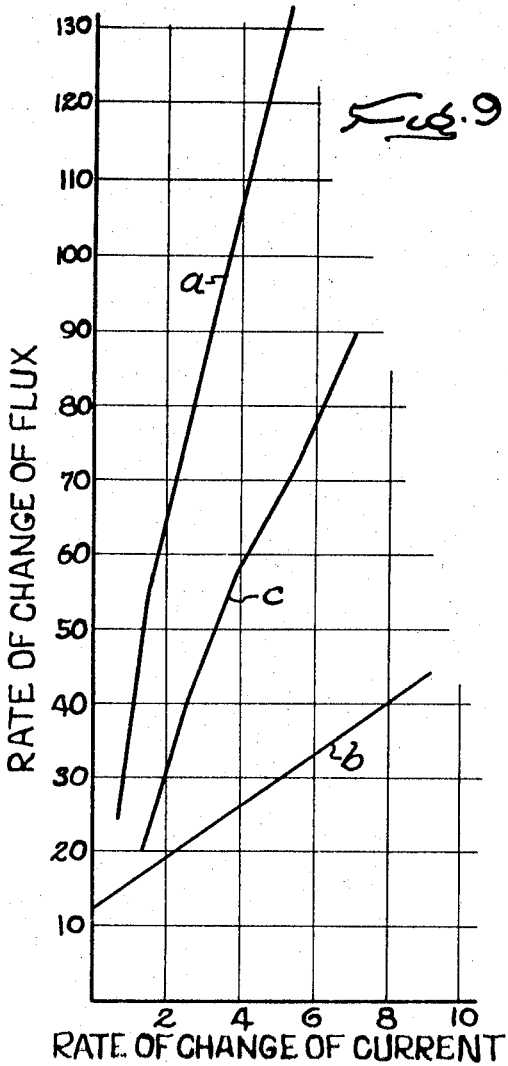
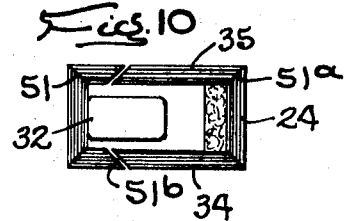
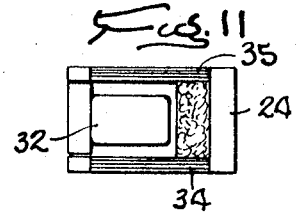
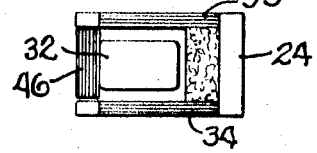
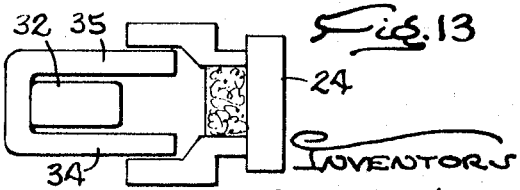

United States Patent Office 3,444,970
Patented May 20, 1969

3,444,970
MAGNETIC FRICTION COUPLING WITH PARTLY LAMINATED FLUX CIRCUIT
Robert H. Clark, Stevensville, Mich., and Philip E. Myers, Beloit, Wis., assignors to Warner Electric Brake & Clutch Company, South Beloit, Ill., a corporation of Delaware
Filed May 5, 1967, Ser. No. 636,382
Int. Cl. F16d 27/00, 37/02, 19/00
U.S. Cl. 192—84                                12 Claims

ABSTRACT OF THE DISCLOSURE

A magnet core of U-shaped cross section encloses a winding in the toroidal flux circuit of a friction clutch or brake and comprises pole pieces in the form of concentric laminated cylinders spanned at one end by friction material to form one coupling face and at the other end by a ferromagnetic member which is unlaminated. The cylinders and member are encapsulated in plastic to form with the wear segments a rigid assembly.

Thin ferromagnetic strips are tightly and spirally wound to form and laminate the pole pieces and thus reduce substantially the lags induced by the generation of eddy currents in the flux circuit during rapid energization and deenergization of the winding.

BACKGROUND

This invention relates to magnetic friction couplings, clutches and brakes, in which the coupling elements are drawn into axial gripping engagement by flux threading a toroidal circuit enclosing a control winding and defined by an armature ring and a magnet core of U-shaped cross section having generally cylindrical pole pieces terminating at end faces flush with and spanned by wear resistant friction material. The parts of the flux circuit in such couplings are usually formed economically as stampings of solid iron in which eddy currents are induced creating parasitic fluxes which oppose the primary coil flux and contribute to lags in the attainment of full torque and full release thereof. Prior attempts to laminate parts of the flux circuit and reduce such lags have involved cross sections not easily formable from highly permeable iron and requiring substantial waste of costly material.

SUMMARY OF THE INVENTION

The present invention overcomes the foregoing objections and is based on our discovery that the eddy current induced lags in a friction coupling of the above character can be substantially eliminated by laminating only those parts of the toroidal flux circuit which are cylindrical and can be formed economically by the spiral winding of thin bands of ferromagnetic material of optimum magnetic permeability. The concentric pole pieces thus formed are spanned at one end by nonmagnetic material cooperating with the ends of the cylinders to form one friction face of the coupling. The U-shaped cross section of the magnet core is completed by a member spanning the opposite ends of the laminated cylinders and having one part, in the case of a brake, and several parts in the case of a clutch, composed of solid iron and formed economically by machining or sheet metal stamping. A unique aspect of the invention is the manner of encapsulating the several parts of the magnet core in plastic material in order to join the parts into a rigid assembly and minimize the reluctance of the abutment joints between the laminated and unlaminated parts of the magnet core. The invention also resides in the novel manner of stationarily mounting the magnet winding in both the brake and clutch versions of the present invention.

Other objects and advantages will become apparent from the following description and drawings.

FIGURE 1 of which is a fragmentary diametrical sectional view of a power transmission incorporating friction clutch and brake couplings embodying the novel features of the present invention.

FIG. 3 is a perspective view of the clutch winding and its mounting.

FIG. 4 is an exploded perspective view of the parts of the magnet core of the clutch.

FIG. 5 is a fragmentary perspective view of the clutch core after the encapsulation in plastic.

FIG. 6 is a perspective view illustrating the spiral winding of a pole piece of the magnet.

FIG. 7 is a section taken along the line 7—7 of FIG. 1.

FIG. 8 is an end view of the final magnet assembly.

FIG. 9 shows curves comparing flux and current changes with different patterns of lamination in the flux circuit of the clutch as shown in section in FIGS. 10, 11 and 13.

FIG. 12 is a modification of FIG. 11.

DETAILED DESCRIPTION

Figure 1:
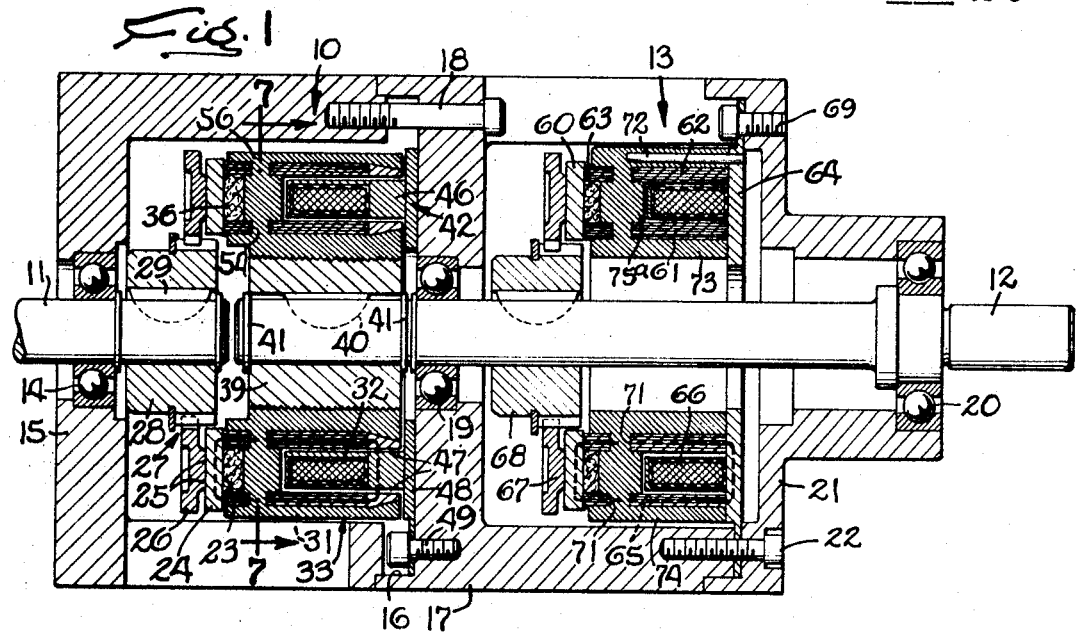
Figure 2:
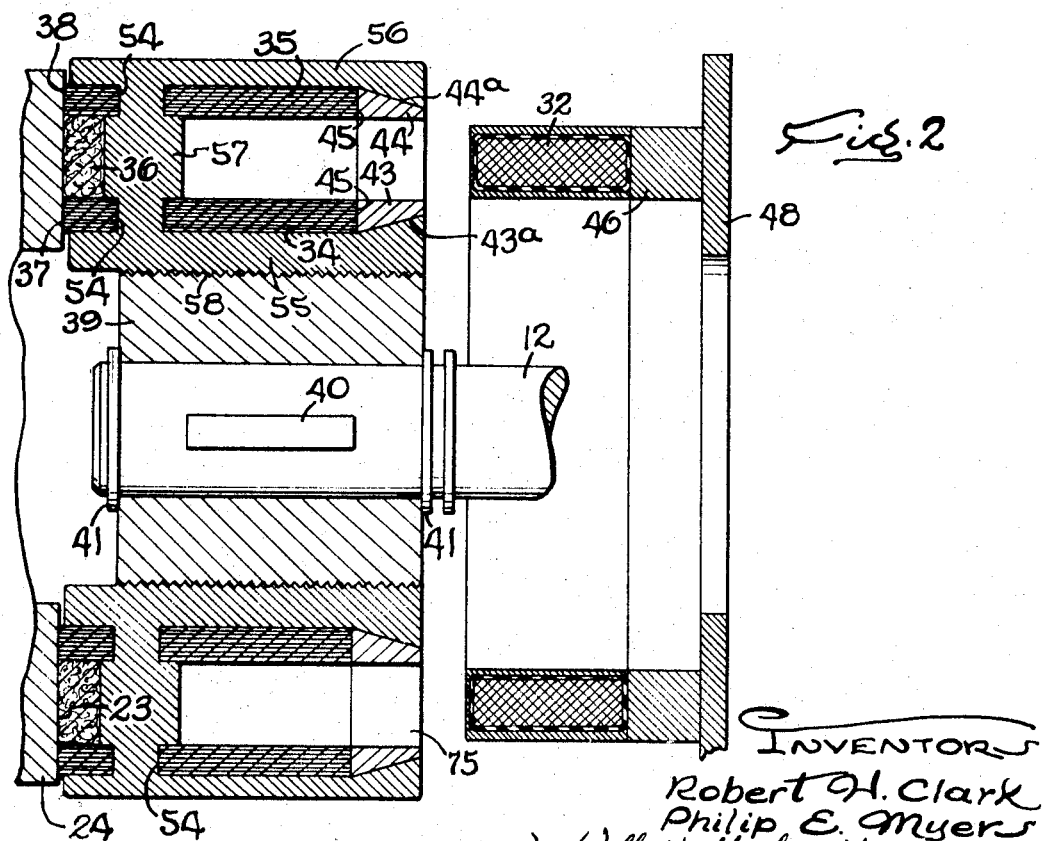
FIG. 2 is an enlarged and exploded fragmentary section of the clutch shown in FIG. 1.

The invention is shown in FIG. 1 incorporated in a magnetic friction clutch 10 for coupling a driving shaft 11 to a driven shaft 12 and in a brake 13 for applying a retarding torque to the driven shaft. The shaft 11 projects through and is journaled in a bearing 14 supported by a stationarily mounted cup 15 telescoped and piloted into the bottom 16 of a cup 17 and clamped by screws 18 against the end of the cup which is supported by bearings 19 and 20 on the driven shaft. The brake is enclosed within the cup 17 whose open end is closed by a plate 21 clamped to the end of the cup 17 by screws 22 and supporting the outboard bearing 20 of the driven shaft.

The driving face 23 of the clutch is on an armature ring defined by segments 24 angularly spaced around and individually secured as by spot welds 25 to a flat supporting ring 26 splined at 27 to a hub 28 which is secured to the drive shaft by a key 29 and axially positioned therealong by snap rings. The segments 24 may be solid iron stampings.

The armature forms one end portion of a toroidal flux circuit 31 which encloses and is activated by energization of a multiple turn stationary winding 32 disposed within an annular magnet core of U-shaped radial cross section. In stationary field magnetic clutches of the type shown, the core includes a rotor 33 fixed to the driven shaft 12 and comprising concentric inner and outer tubular pole pieces or cylinders 34 and 35 spanned at one end by a ring or segments 36 of nonmagnetic wear resistant friction material flush with the end faces 37 and 38 of the pole pieces and forming therewith the driven face of the clutch. The inner pole piece is fixed as will appear later to a hub 39 of suitable material such as aluminum secured as by a key 40 to the driven shaft 12 and located axially thereon as by snap rings 41.

At the other ends of the pole pieces, the flux circuit is completed by a member 42 which, in the case of the clutch, is composed of inner and outer rings 43 and 44 of iron securely held in close abutment with the ends 45 of the pole pieces 34, 35 and surrounding an intermediate stationary ring 46 telescoped between the rings 43 and 44 and separated therefrom by narrow radial air gaps 47. The central ring is welded or otherwise secured to a disk 48 which in this instance is secured by screws 49 to the closed end of the casing cup 17 so as to locate the ring precisely concentric with the rings 43, 44. The winding 32 telescopes loosely within the pole pieces 34 and 35 and is secured to the inner end of the intermediate ring 46 by suitable adhesive.

For most applications of clutches of the above general character, all parts of the flux circuit are formed economically of solid iron usually by stamping from sheet metal. However, where such a clutch is energized and deenergized at relatively high frequency, eddy currents of objectionable magnitudes are induced within the parts creating parasitic fluxes which oppose the control fluxes in the circuit 31, thus imposing objectionable lags in the attainment of full torque upon energization of the winding or quick release of the clutch when the winding is deenergized.

Ideally, such eddy currents may best be eliminated by laminating the iron of the entire flux circuit in the manner shown in FIG. 10, so that the laminations in the armature and each part of the U-shaped magnet core are disposed edgewise to the direction of threading of the flux in the circuit shown by the dotted line. Obviously, this involves numerous and costly materials and manufacturing complications including the formation of the magnet core with laminations of U-shaped cross section and the mitering of the adjacent parts at joints 51, 51ª and 51ᵇ as shown in FIG. 10. Such complete lamination of the parts of the stationary field clutch above described is virtually prohibitive from a comercial standpoint no only because of limitations on the materials usable and the difficulty of producing tight joints but also because of the excessive waste of material in forming the separate parts of the magnet core.

When all of the parts of the magnetic flux circuit are laminated and mitered together accurately in the ideal manner shown in FIG. 10, the flux in the toroidal circuit will change rapidly with changes in the current energizing the winding 32 following the curve $a$ (FIG. 9). On the other hand, if all of the parts of the flux circuit are unlaminated as shown in FIG. 13 for clutches not requiring rapid response, the slope of the curve is reduced greatly as indicated at $b$.

The present invention is based on our discovery that a rapidity of response closely approaching the ideal shown at $a$ may be achieved when only the cylindrical parts of the magnet core, namely the pole pieces 34 and 35, are laminated and thus adapted for the edgewise threading of flux therethrough, the remaining parts comprising the armature 24 and the rings 43, 44 and 46 being composed of solid unlaminated Armco iron so as to be formable at low cost by machining or sheet metal stamping. Being cylindrical these pole pieces with laminations extending longitudinally thereof, may be formed at low cost from thin strips 52 of magnetic iron spirally wound as shown in FIG. 6 into tubular from preferably cylinders of the required radial thickness. Not being deformed in the winding, the strips, preferably about .004 of an inch thick, may be composed of silicon steel having optimum magnetic permeability. A suitable steel for this purpose is that sold by Alleghany-Ludlum under the name Silectron and having a thin surface coating called Carlite which insulates the adjacent turns of the spiral from each other and will withstand the temperature attained in annealing to relieve stresses after the spiral winding.

The tight winding of each spiral may be retained by tack welding or vacuum impregnation of the coil with plastic which will withstand the annealing temperature. After the winding, each cylindrical coil is slotted longitudinally throughout its full length, as indicated at 53, to interrupt the circumferential continuity of the iron and thus prevents the induction of parasitic currents in the iron by action of the spiral coil as a transformer secondarily coupled with the winding 32.

Also, for encapsulating and rigidly joining the assembled parts of the magnet core with molded plastic, each coil is drilled to provide a number of radially extending holes 54 near the pole face end and angularly spaced around the cylinder. The ends 37, 38 and 45 of the laminated pole pieces are machined and squared precisely. To insure adequate electric insulation of the adjacent turns from each other, each coil, after the machining, is immersed in an etching solution to remove burrs or other elements left connecting the adjacent turns.

The inner and outer rings 43, 44 also are machined to abut precisely and provide joints of minimum reluctance at the ends 45 of the pole pieces. To increase the effectiveness of interlocking with the encapsulating plastic, the inner and outer surfaces 43ª, 44ª of the rings 43, 44 are beveled and taper axially in cross section and away from the pole piece ends 45. Like the pole pieces, these rings are also split longitudinally as indicated at 59 to avoid the transformer action above referred to, the slots 53 and 59 registering with each other in the final assembly and becoming filled with the encapsulating plastic. Also, the intermediate ring 46 is split at 78 (FIG. 3) and the plate 48 is slotted at 79 thus interrupting the metal of these in the final assembly.

The substantial reduction in the detrimental effects of eddy currents in flux circuits of the above character is made possible in the clutch above described first by locating the radial air gaps 47 at the end of the toroidal flux path 31 remote from the friction faces of the clutch. As a result, an optimum peripheral length of the circuit cross section, that is, the pole pieces 34, 35 are cylindrical and capable of being formed economically by the spiral winding above described and adapted for the threading of the flux without interference and edgewise of the laminations.

Secondly, the threading of the flux around the closed end of the U-shaped section of the circuit and through joints of minimum reluctance is achieved by encapsulating the pole pieces, the rings 43, 44 and the wear segments in plastic while they are held precisely in the desired final position relation. This is accomplished by locating the parts in a suitable mold and introducing plastic, preferably of the epoxy type, into the mold for flowing around the outer piece 35, inwardly through the holes 54 and the slots 53 so as to form an inner tube 55 rigidly joining the pole piece 34 to the ring 43 and the knurled surface 58 of the hub 39, a tube 56 around the outer pole piece and the ring 44 and a connecting ring 57 disposed between the pole pieces and forming a rigid backing for the wear ring 36.

In the encapsulating, the parts are supported on a suitable mandrel which limits the flow of plastic so as to leave the annular space 75 between the ends of the pole pieces open for later reception of the winding 32 and the intermediate rings 46 of the magnetic member 42.

With the flux circuit of the clutch thus constructed of spirally laminated pieces 34 and 35 and solid iron rings 43, 44 solidly held in abutment with the ends of the pieces by the plastic capsule, the clutch with only the cylindrical pieces laminated as shown in FIG. 11, will possess a response curve $c$ (FIG. 9) closely approaching the curve $a$ of a clutch having a fully laminated flux circuit (FIG. 10). As a result, the laminated parts of the circuit may be constructed economically by the spiral winding using material of optimum permeability while the remaining parts are of solid iron and capable of being formed economically by simple machining operations or sheet metal stampings. No mitering or the introduction of objectionable reluctances at the joints between the laminated and solid parts is involved. The flux circuit thus extends edgewise through the laminations of the pole pieces 34 and 35 and the solid abutment joins with the rings 43 and 44 and therefore is of minimum overall reluctance.

Final assembly of the clutch is achieved by clamping the plate 48 against the support 17 and the latter against the open end of the cup 15. The winding attached to the intermediate ring 46 is thus projected into the space 75 between the rings 43, 44 and the pole pieces thereby establishing the air gaps 47 so as to form the member 42 composed of three solid iron rings 43, 44 and 46 spanning the ends of the laminated pole pieces to complete the U-shaped magnetic core.

If desired, the intermediate ring 46 of the clutch may be laminated while providing for threading of the flux edgewise therethrough and around the circuit 31. This may be accomplished as shown in FIG. 12 by a stack of laminations in the form of flat annuli having the proper inner and outer diameters. So very little improvement in the response of the clutch is achieved by thus laminating the ring 46 that the added costs of a laminated ring as constructed with solid iron are not ordinarily justified.

The invention as described above is also incorporated in the brake 13 which comprises an armature ring 60 of solid iron and a magnet core comprising inner and outer cylindrical pole pieces 61 and 62 spanned at one by wear segments 63 and abutting at the other end with a member 64 to complete the toroidal flux circuit 65 enclosing a multiple turn annular winding 66. Segments forming the armature are spot welded to a ring 67 splined onto a hub 68 which is keyed to the driven shaft.

As in the clutch, each of the pole pieces is a tightly and spirally wound strip of ferromagnetic material of high permeability thus forming a cylinder with the successive turns or laminations adapted for the threading of flux edgewise therethrough. Since the brake magnet is mounted stationarily, the member 64 spanning the magnet end of the circuit 65 comprises a single flat disk of solid Armco iron larger than the outer pole and apertured for clamping by screws 69 to the end plate 21 of the casing. The winding 66 telescopes loosely within the pole pieces and is secured to disk 64 by suitable adhesive.

As before, the pole pieces 61 and 62 are split longitudinally and formed with angularly spaced holes 71 to permit of encapsulation in plastic and joining with the disk 64 into a rigid assembly with the disk in full abutment with the ends of the pole pieces. The disk 64 is also slotted radially like the clutch plate 48. Secure locking of the disk to the pole pieces is facilitated by pins 72 rigid with the disk and arranged in an annular series around the outer pole piece.

With the pole pieces and the member 64 held in the desired relation, molten plastic is flowed around the assembly and sets into the form of inner and outer tubes 73, 74 joined through the holes 71 to a ring 75ª of plastic rigidly spacing the pole pieces apart and forming a backing for the wear segments 63. The pins 72 become embedded in the plastic of the outer tube so that the disk 64 is held securely in abutment with the pole piece ends.

We claim as our invention:

1. A magnetic friction coupling having, in combination, inner and outer concentric pole pieces each comprising an elongated band of ferromagnetic material spirally wound to form a rigid laminated tube, one end of said pole pieces defining pole faces disposed in a common axial plane, a ring of nonmagnetic material disposed between and rigidly joining the pole pieces at one end and coacting with said pole faces to define a flat and annular friction face adapted for axial gripping engagement with the opposed friction face of an armature ring, a flux-carrying member spanning and abutting against the opposite ends of said pole pieces to form therewith a magnet core of U-shaped cross section cooperating with said armature to provide a toroidal flux path, the parts of said member which abut said pole pieces being composed of solid and unlaminated ferromagnetic material, a body of plastic material molded around and encapsulating said pole pieces and said member and joining the same and said nonmagnetic ring into a rigid unit with said member held securely in abutment with the pole piece ends, and an annular multiple turn winding disposed between said pole pieces and secured to and supported by said member.

2. A friction coupling as defined in claim 1 in which the adjacent turns of each of said spirally wound bands are insulated electrically from each other.

3. A friction coupling as defined in claim 1 in which each of said pole pieces is slotted longitudinally to interrupt the circumferential continuity of the metal thereof.

4. A friction coupling as defined in claim 3 in which said flux-carrying member is slotted and interrupted along a radial plane in register with the ends of the slots in said pole pieces.

5. A friction coupling as defined in claim 1 in which said plastic body includes concentric sleeves rigid with and telescoped around the exterior and interior of said outer and inner pole pieces respectively and integrally joined to each other through radially disposed holes in the pole pieces.

6. A friction coupling as defined in claim 1 in which all of the parts of said flux-carrying member are composed of solid iron.

7. A friction coupling as defined in claim 5 in which said flux-carrying member comprises inner and outer concentric rings enclosed and held in abutment with the ends of said pole pieces by the molded plastic and further comprises an intermediate ring loosely telescoped between the inner and outer rings and supporting said winding, and means stationarily supporting said intermediate ring.

8. A friction coupling as defined in claim 7 in which the outer and inner surfaces of said outer and inner rings taper axially to interlock with the plastic of said sleeves.

9. A friction coupling as defined in claim 5 in which said flux-carrying member comprises a single piece of unlaminated ferromagnetic material abutting said opposite pole piece ends and the ends of the sleeves formed by the molded plastic.

10. A friction coupling as defined in claim 9 in which said flux-carrying member includes angularly spaced projections projecting along the axis thereof and embedded in the plastic of one of said sleeves.

11. In a magnetic friction clutch, the combination of, inner and outer cylindrical pole pieces of substantially equal axial lengths and laminated throughout their lengths, each comprising an elongated spirally wound band of ferromagnetic material, a ring of nonmagnetic material disposed between and spanning said pole pieces at one end thereof and presenting a surface flush with the ends of the pole pieces to define a flat friction face adapted for axial gripping engagement with an opposed armature ring, a flux-carrying member spanning the opposite ends of said pole pieces to form therewith a magnet core providing a flux path of U-shaped cross section, said member comprising outer and inner rings of solid and unlaminated ferromagnetic material abutting the spirally laminated ends of said outer and inner pole pieces, and an intermediate ring of ferromagnetic material disposed in the plane of and telescoped loosely with said outer and inner rings and completing a toroidal flux path through said armature ring, said pole pieces and the inner, outer and intermediate rings, means stationarily supporting said intermediate ring to provide narrow radial air gaps between said intermediate ring and said inner and outer rings, an annular multiple turn winding disposed between said pole pieces and secured to the inner axial face of said intermediate ring, and nonmagnetic material enclosing said pole pieces and holding said nonmagnetic ring, said pole pieces, and the parts of said member in fixed relation.

12. In a magnetic friction clutch the combination of, concentric tubular pole pieces each composed of laminations encircling the axis of the tubes and composed of ferromagnetic material, one end of said pole pieces defining a friction face adapted for axial gripping engagement with an opposed armature ring, a flux-carrying member spanning the opposite ends of said pole pieces, said member comprising outer and inner rings of solid and unlaminated ferromagnetic material abutting the ends of said pole pieces, and an intermediate ring of ferromagnetic material disposed in the plane of and telescoped loosely with said outer and inner rings and completing a toroidal flux path through said armature ring, said pole pieces and the inner, outer, and intermediate rings, means stationarily supporting said intermediate ring to provide narrow radial air gaps between said intermediate ring and said inner and outer rings, an annular multiple turn winding disposed between said pole pieces and secured to the inner axial face of said intermediate ring, and nonmagnetic material enclosing said pole pieces and holding said nonmagnetic ring, said pole pieces, and the parts of said member in fixed relation.

References Cited
UNITED STATES PATENTS

| | | | |
|---|---|---|---|
| 2,612,248 | 9/1952 | Feiertag | 192—18.2 X |
| 2,820,928 | 1/1958 | Tourneau | 192—84 X |
| 3,007,561 | 11/1961 | Harting. | |
| 3,016,580 | 1/1962 | Jaeschke | 192—84 X |
| 3,196,322 | 7/1965 | Harper | 335—281 X |

CARLTON R. CROYLE, *Primary Examiner.*

ALLAN D. HERRMANN, *Assistant Examiner.*

U.S. Cl. X.R.

188—163; 192—18; 335—281